E. L. RILEY.
STOCK WATERING DEVICE.
APPLICATION FILED JAN. 31, 1914.
1,151,125.
Patented Aug. 24, 1915.
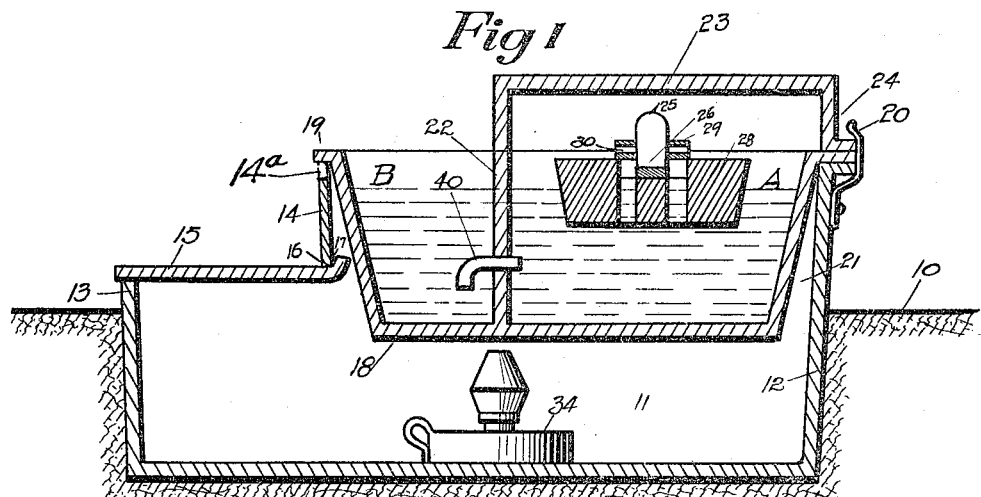
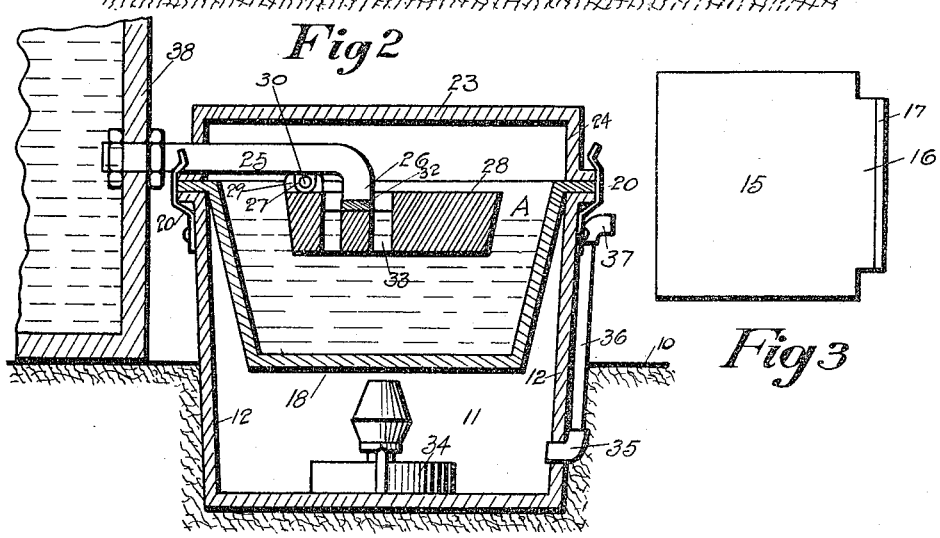
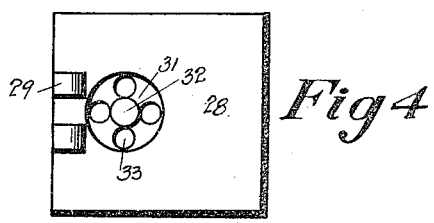
WITNESSES
INVENTOR
Earl L. Riley
BY
ATTYS.

UNITED STATES PATENT OFFICE.

EARL L. RILEY, OF STANHOPE, IOWA.

STOCK-WATERING DEVICE.

1,151,125.

Specification of Letters Patent. Patented Aug. 24, 1915.

Application filed January 31, 1914. Serial No. 815,820.

*To all whom it may concern:*

Be it known that I, EARL L. RILEY, a citizen of the United States, residing at Stanhope, in the county of Hamilton and State of Iowa, have invented a certain new and useful Stock-Watering Device, of which the following is a specification.

The object of my invention is to provide a device of simple, durable and inexpensive construction.

More particularly, it is my object to provide a stock watering device of the type having a suitable source of heat and so constructed and arranged that only a comparatively small portion of the water in the device is exposed directly to the open air and also so arranged that the water from the main reservoir may be fed to the water in the drinking trough, while filth will not get from the drinking trough back to the main reservoir.

Still a further object is to provide such a device having an automatic means for controlling the supply of water furnished to the main reservoir.

My invention consists in certain details, in the construction, arrangement and combination of the various parts of the device, whereby the objects contemplated are attained, as hereinafter more fully set forth, pointed out in my claim, and illustrated in the accompanying drawings, in which:

Figure 1 shows a longitudinal, vertical, sectional view through a stock watering device embodying my invention. Fig. 2 shows a transverse, vertical, sectional view of the same showing also a portion of a large supply tank and the manner in which the flow of water from the supply tank to the main reservoir is controlled. Fig. 3 shows a top or plan view of the hinged lid of my device, and Fig. 4 shows a top or plan view of the combined valve and float.

My improved stock watering device is designed to be placed in the ground with only a portion extending above the surface of the ground.

In the accompanying drawings, I have used the reference numeral 10 to indicate generally the surface of the ground in which my stock watering device is placed.

My stock watering device comprises a lamp receptacle 11 having side walls and one end wall 12 which extend above the level of the ground and having one comparatively short end wall 13. The receptacle 11 is also provided with a transverse partition 14 spaced apart from its ends and extending from the top of the walls 12 downwardly to a line just above the level of the top of the side wall 13. It will be understood that the side walls 12, from the partition 14 to the wall 13, are also shorter and extend upwardly only to the upper level of the wall 13.

Resting upon the short ends of the side walls 12 and upon the end wall 13, is a removable cover or lid 15 having a portion 16 designed to be received beneath the partition 14. The inner edge of the portion 16 is turned upwardly at 17 so that in order to move the lid 15, it is necessary to raise its free end until the flange or upward extension 17 clears the partition 14.

Received within the upper portion of the receptacle 11 is a reservoir 18 having on its upper edge an annular outwardly extending flange 19 resting upon the walls 12 and the partition 14 and held in position thereon by means of spring clips 20. The side walls of the reservoir 18 are inclined from their upper ends downwardly and inwardly so as to leave an air space 21 between the side walls of the reservoir 18 and the walls 12 and the partition 14.

Near one end, the reservoir 18 is provided with a transverse partition 22 which divides the reservoir into two compartments, one of which, indicated by the reference character A, I shall refer to as the supply reservoir, and the other, indicated by the reference character B, I shall hereinafter refer to as the drinking trough.

Mounted in the partition 22, is a small tube 40 communicating with the interior of the supply reservoir A and designed to permit water to flow therefrom into the drinking trough B. The outer end of the tube 40 is turned downwardly to prevent the passage of filth from the drinking trough B to the reservoir A.

The supply reservoir A is covered by a detachable cover 23. The detachable cover 23 is provided with an annular downwardly extending flange or side wall 24.

In the side wall 24, at one side of the cover 23, is mounted an intake pipe 25 which, at its inner end, is provided with a downward extension 26. By mounting the intake pipe 25 in the side of the cover 23, it is possible to reverse the position of the cover and thereby locate the intake pipe on either side of the supply reservoir, as may be desired.

The supply pipe 25 is provided near the downward extension 26 with downwardly extended brackets or bearings 27.

Mounted on the supply pipe 25 is a combined pipe and valve having a float body 28 and having formed on its upper surface, near one side thereof—upwardly extending bearings or brackets 29 which may be placed in alinement with the bearings 27 to receive a pin 30, whereby the float body 28 is pivotally mounted on the supply pipe 25.

In the upper surface of the float body 28, below the extension 26, when said float body is in a substantially horizontal position, is a depression 31 which may be annular and is provided in the center with a rubber or other suitable valve device 32 which, when the float body 28 is held up by the water, closes the opening in the extension 26, as shown in Fig. 2.

Extending downwardly from the bottom of the depression 31, around the central portion thereof, is a plurality of holes 33 extending through the body 28. Below the receptacle 18, and preferably located approximately below the partition 22, is a suitable means 34 for supplying heat which may be a lamp capable of being inserted into the receptacle 11 by raising the lid or cover 15.

The space around the upper edge of the walls 12 is not air tight, but for insuring sufficient ventilation, I provide an elbow 35 extending through one of the side walls 12 near the lower part thereof at a suitable point for supplying fresh air to the lamp 34. On the outside of the wall 12 an upwardly extending pipe 36 is connected with the elbow 35. At the upper end of the pipe 36 is another elbow 37 which is used in order to avoid the pipe having an open upper end which would receive dirt and the like.

In the practical operation of my improved stock watering device, the supply pipe 25 is connected with a suitable source of water supply such, for instance, as a large tank 38. The water will flow from the large tank into the receptacle 18 until it raises the float 28 to position for closing the opening of the extension 26 when the water is shut off. Animals may use the drinking trough by drinking from the open trough B, and as they lower the water in the trough B, the water in the supply reservoir A passes through the pipe 40 into the trough B. As the water in the reservoir A is lowered, the float 28 drops away from the extension 26, permitting water to flow from said extension. When both the drinking trough and the reservoir are again filled, the raising of the float 28 will shut off the water supply.

In cold weather, the lamp 34 may be lighted and will heat the water in the receptacle 18 sufficiently to prevent it from freezing.

It will be noted that the dead air space 21 is so arranged that only a minimum of heat is necessary for my device. The main part of the water in the receptacle 18 is covered so that a cushion of vapor may be formed above the water level.

It will also be noted that on account of the construction of the float 28 a more complete circulation is secured while the water is being heated for the reason that cold water coming from the extension 26 will pass downwardly through the openings 33 to the bottom of the reservoir A, thereby assisting the lamp in keeping up a complete and proper circulation. The arrangement of the holes 33 also reduces the strain which would otherwise be imposed on the float member 28 when the water flows from the extension 26.

It will be understood that a number of changes may be made in the details of the construction of my stock watering device without departing from its essential features and it is my intent to cover by this application any such changes as may be included within the scope of the following claim.

I claim as my invention:

In a device of the class described, a receptacle, a supply pipe extended through the wall of said receptacle having a downward extension on its end within the receptacle, a float pivoted to said supply pipe having a depression below and of greater diameter than said extension, a resilient pad in said depression adapted to engage and close the end of the downward extension when the float is raised, said float being provided with a plurality of holes from the bottom of said depression through the body around said pad.

Des Moines, Iowa, January 17, 1914.

EARL L. RILEY.

Witnesses:
E. W. KNUDSON,
CARL P. WILLER.